United States Patent
Tatsubori

(10) Patent No.: US 8,806,432 B2
(45) Date of Patent: Aug. 12, 2014

(54) METHOD, SYSTEM, AND PROGRAM FOR EXECUTING PROGRAM

(75) Inventor: Michiaki Tatsubori, Kanagawa (JP)

(73) Assignee: International Business Machines Corporation, Armonk, NY (US)

( * ) Notice: Subject to any disclaimer, the term of this patent is extended or adjusted under 35 U.S.C. 154(b) by 505 days.

(21) Appl. No.: 13/151,300

(22) Filed: Jun. 2, 2011

(65) Prior Publication Data

US 2011/0302557 A1 Dec. 8, 2011

(30) Foreign Application Priority Data

Jun. 3, 2010 (JP) ................................. 2010-128092

(51) Int. Cl.
*G06F 9/44* (2006.01)
*G06F 9/45* (2006.01)

(52) U.S. Cl.
CPC .. *G06F 8/38* (2013.01); *G06F 8/51* (2013.01); *G06F 9/4433* (2013.01)
USPC ........................................................ 717/115

(58) Field of Classification Search
CPC .................................... G06F 8/30; G06F 8/40
USPC .................. 717/106–108, 114–119, 162–167
See application file for complete search history.

(56) References Cited

U.S. PATENT DOCUMENTS

2008/0163167 A1 7/2008 Buzinov et al.

FOREIGN PATENT DOCUMENTS

| JP | 2010123060 A | 6/2010 |
|---|---|---|
| JP | 2007109044 A | 1/2014 |
| WO | WO 2011/087993 A1 | 7/2011 |

OTHER PUBLICATIONS

"VM Bridge FAQ", Feb. 2009, retrieved from http://php-java-bridge.sourceforge.net/pjb/FAQ.html, 13 pages.*
"php.java.bridge—Class JavaBridgeRunner", Jul. 2009, retrieved from http://php-java-bridge.sourceforge.net/pjb/server/documentation/API/php/java/bridge/JavaBridgeRunner.html, 4 pages.*
"Welcome to Project Zero", IBM Corporation, Aug. 17, 2009, https://web.archive.org/web/20090817172441/http://www.projectzero.or/.
Slattery, "Get started with Project Zero, WebSpere sMash, and PHP", Feb. 12, 2009, http://ibm.com/developerworks/library/wa-pz-intro.
Benda et al., "Phalanger: Compiling and Running PHP Applications on the Microsoft .NET Platform,". Net Technolgies 2006, May 29, 2006.

* cited by examiner

*Primary Examiner* — Ted T Vo
(74) *Attorney, Agent, or Firm* — Scully, Scott, Murphy & Presser, P.C.; Gail H. Zarick, Esq.

(57) ABSTRACT

A computer implemented method for virtually executing a program having property declarations of classes in a first programming language that is a dynamic scripting language on an execution system of a second programming language. The method includes: generating an interface class from a property name in the first programming language; loading the interface class; and preparing a class hierarchy on the execution system of the second programming language. A system and a computer readable article of manufacture for executing the same are also provided.

10 Claims, 13 Drawing Sheets

FIG. 11

<sub></sub>

1012

| KEY | | VALUE |
|---|---|---|
| PLACE FOR DECLARATION (FOR EXAMPLE, FILE AND OFFSET) | IMPLEMENTATION OF INHERITED SUPERCLASS (ID OF Java CLASS) | IMPLEMENTATION OF DECLARED CLASS (ID OF Java CLASS) |
| {"include/module/B", 02-02-2009 12:30:30, 1} | null | PO12_B@ClassLoaderXX |
| {"include/module/C", 02-02-2009 12:30:30, 2} | Class12@ClassLoaderXX | PO234_C@ClassLoaderXY |

```
class POPObject extends PHPValue {
    Map<NameString, PHPValue> properties;
    PHPValue getNotDeclared(NameString propName) {
        PHPValue result = properties.get(propName);
        if (result != null) return result;
        // not found
    }
    protected PHPValue getReflectivelyNoWarning(NameString propName) {
        return properties.get(propName);
    }
    final PHPValue getReflectively(NameString propName) {
        PHPValue result = getReflectivelyNoWarning(propName);
        if (result != null) return result;
        // not found
    }
}
```

PHP SOURCE CODE
1204
```
<?php
class B {
    var $q;
}
?>
```

Java CLASS  1206

```
class PO12_B extends PHPObject
        implements PropertyHolder_q {
    @Override
    protected PHPValue getReflectivelyNoWarning(NameString propName) {
        PHPValue result = super.getReflectivelyNoWarning(propName);
        if (result != null) return result;
        if (propName.equals(<q>)) return q;
        return null;
    }
    ...
}
```

EXTENDED

METHOD, SYSTEM, AND PROGRAM FOR EXECUTING PROGRAM

CROSS-REFERENCE TO RELATED APPLICATION

This application claims priority under 35 U.S.C. §119 from Japanese Patent Application No. 2010-128092 filed Jun. 3, 2010, the entire contents of which are incorporated herein by reference.

BACKGROUND OF THE INVENTION

1. Technical Field

The present invention relates to a technique for calling and executing a program on a computer.

2. Related Art

Dynamic scripting languages such as PHP and more static programming languages such as Java® have been used as programming language processing and execution systems used in server environments. Recently, arrangements have been provided in which a dynamic scripting language program such as a PHP program declares a class of a static language platform such as Java® virtual machines or the Common Language Infrastructure (CLI) so that, for example, PHP programs can readily invoke class assets of Java® with untyped access to these classes enabled.

Since a Java® VM is a static programming environment a loaded class object remains in memory for a long period of time. In contrast, in a programming model of a dynamic language processing system such as PHP, in general, a period during which a loaded class object resides on a memory is relatively short.

Japanese Unexamined Patent Application Publication No. 2007-109044 relates to conversion of a program in which the process varies with the content of an argument to a program that can be readily analyzed and discloses a dedicated called program generation unit that detects a called program; each argument changing the process of the called program, and each content of the argument in a program group and generates a program for executing only a part of the process of the called program; the part corresponding to the content of the argument, as a dedicated called program for the argument and the content of the argument; a call position detection unit that detects a call position at which the called program is called from the program group; and a calling program rewriting unit that rewrites the call position so that the dedicated called program generated by the dedicated called program generation unit is called.

US 2008/0163167 A1 relates to a technique for executing a Java® object method invocation using a scripting language. There are disclosed a method for providing a unitary system for invoking a Java method from a Java access implementation of a scripting language and a technique for enabling field access by name.

Japanese Patent Application No. 2008-298346 describes a method for allowing handling of an unknown type object and allowing avoidance of an increase in overhead of execution, particularly as an application programming interface so as to provide a method for accessing an unknown type object at high speed. The programming interface includes a function capable of directly using a value in a field even when the type of the field to be accessed is a primitive type; a function capable of directly using a primitive type value even when the type of a parameter or a return value of a method to be called is a primitive type; and a function capable of generating runtime code specialized in a class of an object to be accessed.

In the generated code, a designated method such as a getter/setter method is directly called.

In Project Zero development guide, it is disclosed that the PHP Java Bridge in WebSphere sMash can be used to interact with Java® objects, implement Java interfaces, and instantiate and extend Java classes. In the Project Zero development guide, code for invoking Java classes from PHP code is described. For example, the following exemplary code is shown:

```
<?php
...
$map = new Java("java.util.HashMap");
$map->put("title","Java Bridge");
...
echo $map->get("title")."\n";
...
?>
```

However, in the known art, a problem still exist in that, when dynamic access to a generated class object from a dynamic scripting language processing system such as PHP is enabled, access must be performed as a slow hash table access for each time and thus results in a bad execution performance, as described above.

SUMMARY OF THE INVENTION

Accordingly, it is an object of the invention to reduce the overhead of access to a static class of, for example, a Java® VM from a dynamic scripting language processing system such as PHP.

One aspect of the present invention provides a computer implemented method for virtually executing a program in a first programming language that is a dynamic scripting language, the program having property declarations of classes, on an execution system of a second programming language, the method including the steps of: generating an interface class that is uniquely determined from a property name in the program in the first programming language; loading the interface class; and preparing, for a first class of the first programming language occurring during execution of the program in the first programming language, and when the first class of the first programming language directly inherits a second class of the second programming language, a class hierarchy on the execution system of the second programming language so that the class hierarchy corresponds to a dynamically created class hierarchy on the program in the first programming language by caching a second class of the second programming language inheriting a first class of the second programming language, and with the first class of the second programming language corresponding to the first class of the first programming language being a key, where fields are prepared in the first and second classes of the second programming language corresponding to the respective property declarations of the first and second classes of the program in the first programming language, and a property access step via the interface classes is enabled by the classes of the second programming language prepared so as to implement the interface classes.

Another aspect of the present invention provides a non-transitory computer readable article of manufacture tangibly embodying computer readable instructions which when executed causes a computer to carry out the steps of a method for virtually executing a program in a first programming language that is a dynamic scripting language, the program having property declarations of classes, on an execution system of a second programming language, the method including the steps of: generating an interface class that is uniquely determined from a property name in the program in the first programming language; loading the interface class; and preparing, for a first class of the first programming language occurring during execution of the program in the first programming language, and when the first class of the first programming language directly inherits a second class of the second programming language, a class hierarchy on the execution system of the second programming language so that the class hierarchy corresponds to a dynamically created class hierarchy on the program in the first programming language by caching a second class of the second programming language inheriting a first class of the second programming language, and with the first class of the second programming language corresponding to the first class of the first programming language being a key, where fields are prepared in the first and second classes of the second programming language corresponding to the respective property declarations of the first and second classes of the program in the first programming language, and a property access step via the interface classes is enabled by the classes of the second programming language prepared so as to implement the interface classes.

Another aspect of the present invention provides a computer implemented system for virtually executing a program in a first programming language that is a dynamic scripting language, the program having property declarations of classes, on an execution system of a second programming language, the system including: means for generating an interface class that is uniquely determined from a property name in the program in the first programming language; means for loading the interface class; and means for preparing, for a first class of the first programming language occurring during execution of the program in the first programming language, and when the first class of the first programming language directly inherits a second class of the second programming language, a class hierarchy on the execution system of the second programming language so that the class hierarchy corresponds to a dynamically created class hierarchy on the program in the first programming language by caching a second class of the second programming language inheriting a first class of the second programming language, and with the first class of the second programming language corresponding to the first class of the first programming language being a key, where fields are prepared in the first and second classes of the second programming language corresponding to the respective property declarations of the first and second classes of the program in the first programming language, and a property access step via the interface classes is enabled by the classes of the second programming language prepared so as to implement the interface classes.

BRIEF DESCRIPTION OF THE DRAWINGS

The invention and its embodiments are described in more detail when taken in conjunction with the accompanying drawings, in which:

FIG. 11 is a table showing exemplary content of a class inheritance relationship cache table.

FIG. 12 is a diagram showing exemplary code of reflective access.

DETAILED DESCRIPTION OF THE PREFERRED EMBODIMENTS

Figure 1:
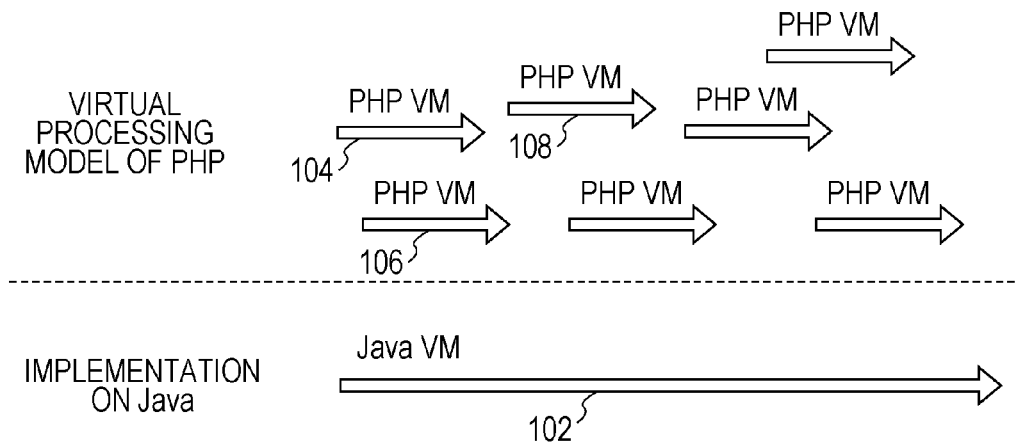
FIG. 1 illustrates a comparison between the respective lives of PHP and Java® objects.

An embodiment of the present invention will now be described with reference to the drawings. It is to be understood that the embodiment is for the purpose of describing a preferred aspect of the present invention and is not intended to limit the scope of the invention thereto. Moreover, unless otherwise specified, the same signs denote the same components throughout the drawings referenced below.

According to the present invention, in order to virtually execute, multiple times, processing from the start to end of a program in a dynamic scripting language such as PHP, as an implementation with a single program execution in a language such as Java®, the implementation consists of a special class loader generating and loading, as necessary, a Java® interface class I(p) that is uniquely determined from a property name p in PHP. Here a dynamic scripting language such as PHP is expected to have a language construct for property declarations of classes and an implementation language is expected to provide a dynamic class loader mechanism as such found in Java®. The special class loader is either the same one as the class loader loading Java® classes generated corresponding to program files, classes, and the like in PHP, or another class loader that is a parent of the former class loader.

According to the present invention, there is a step of preparing, for class C of PHP occurring during execution of a program in PHP, when class C directly inherits class B, a class hierarchy on Java® that is the same as a dynamically created class hierarchy on PHP by caching class C' of Java® inheriting class B', with class B' of Java® corresponding to class B of PHP being a key, during execution of the program.

A step of enabling property access via interfaces is executed by, in a step of generating class C' of Java® corresponding to class C of PHP,
a) declaring class C' so as to set (extend) class B' as its superclass,
b) preparing fields in the classes of Java® corresponding to the respective property declarations of the classes of PHP, and
c) declaring the classes of Java® so as to implement the aforementioned interface class I(p) so as to provide, as an implementation of a method provided in a corresponding interface, code for property access as access to the fields of Java®.

According to the present invention, furthermore, in Java® code corresponding to object access in PHP, a step of performing a runtime class examination (instance of operation in Java) of a target object is first executed. This step (runtime property interface examination) includes:

a) a step of performing, when the interface class I(p) corresponding to the property p that is being accessed is implemented, a method call for fast property access via a corresponding interface of the object, and b) a step of performing, when the interface class I(p) corresponding to the property p that is being accessed is not implemented, low-speed property access by a known, ordinary method such as a table search for an accessor object.

According to the present invention, a step of searching for an accessor necessary in the prior arts is unnecessary, and calling code is generated so that only a type examination needs to be executed. Thus, a code call is fastened.

Figure 3:
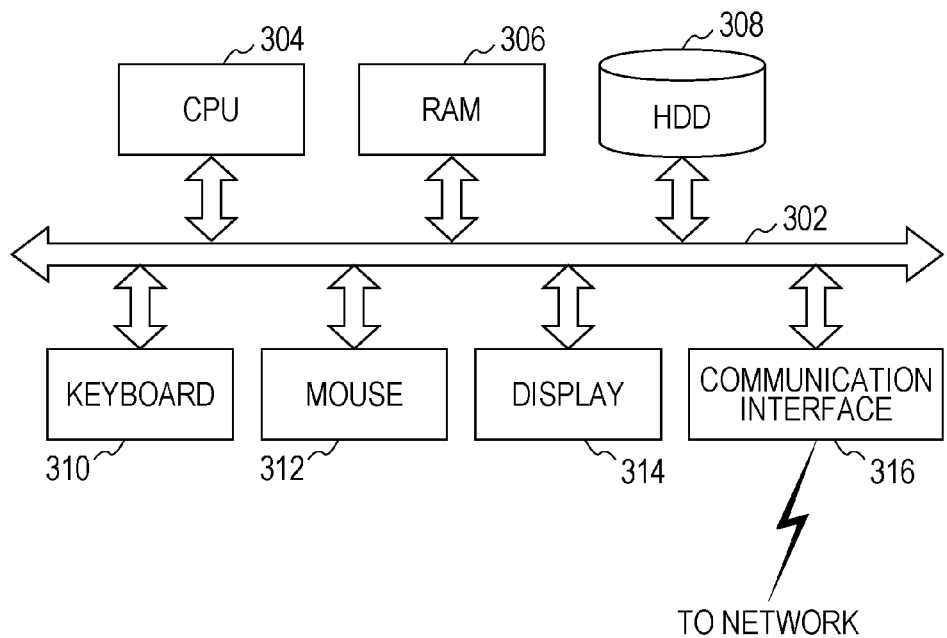
FIG. 3 is a block diagram of a hardware configuration.

Referring to FIG. 3, a block diagram of computer hardware for implementing a system configuration and processing according to an embodiment of the present invention is shown. In FIG. 3, a CPU 304, a main memory (RAM) 306, a hard disk drive (HDD) 308, a keyboard 310, a mouse 312, and a display 314 are connected to a system bus 302. The CPU 304 is preferably based on the 32-bit or 64-bit architecture. For example, Pentium (trademark) 4 or Core (trademark) 2 Duo of Intel Corporation or Athlon (trademark) of AMD can be used as the CPU 304. The main memory 306 has preferably a capacity of 1 GB or more, more preferably, a capacity of 2 GB or more.

An operating system is stored in the hard disk drive 308. The operating system may be any one suitable for the CPU 304, such as Linux (trademark), Windows (trademark) 7, Windows XP (trademark), or Windows (trademark) 2003 Server of Microsoft Corporation, or Mac OS (trademark) of Apple Computer.

Moreover, programs for causing the system to operate as a Web server, such as Apache, are also stored in the hard disk drive 308 and loaded into the main memory 306 at system startup.

Moreover, the Java® Runtime Environment program for implementing a Java® virtual machine (VM) is also stored in the hard disk drive 308 and loaded into the main memory 306 at system startup.

Moreover, Java® class objects, a loader, a PHP Java® bytecode generator, and source code written in PHP are also stored in the hard disk drive 308. In the present invention, Java® class objects, a loader, and a PHP Java® bytecode generator in the prior arts are modified so as to execute functions such as a class inheritance cache described below. The details will be described below.

The keyboard 310 and the mouse 312 are used to manipulate graphic objects displayed on the display 314, such as an icon, a task bar, and a window, in accordance with a graphical user interface provided by the operating system.

The display 314 is preferably, but not limited to, a 32-bit true color LCD monitor with a resolution of at least 1024*768.

A communication interface 316 is preferably connected to a network using the Ethernet® protocol. The communication interface 316 receives a processing request from a client computer (not shown) or returns a processing result to a client computer (not shown) in accordance with a communication protocol such as TCP/IP using functions provided by Apache.

Functional elements for carrying out the present invention and their functions will next be described with reference to a functional layer block diagram in FIG. 4.

Figure 4:
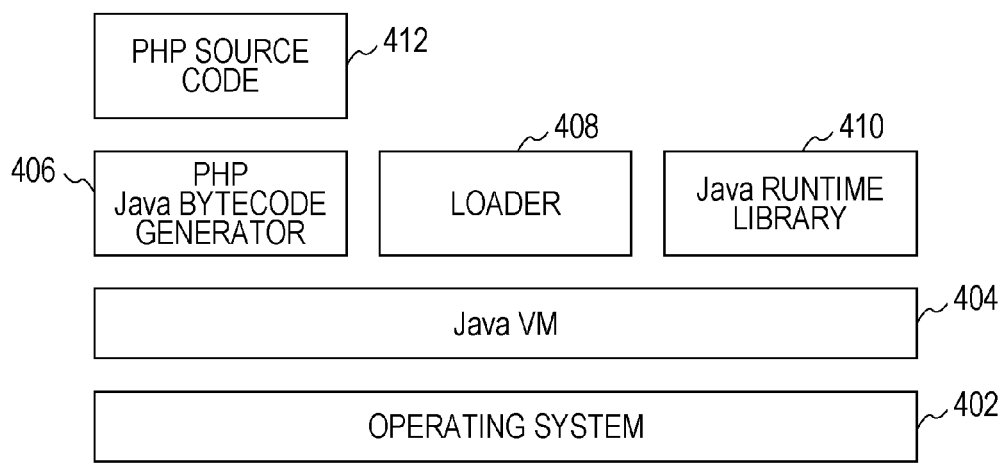
FIG. 4 is a diagram showing the layers of functional blocks.

In FIG. 4, the bottommost layer is an operating system 402. In one embodiment, the operating system 402 is, but not limited to, Windows (trademark) 2003 Server or Linux (trademark).

A Java® VM 404 of a version suitable for the operating system 402 operates above the operating system 402.

A PHP Java® bytecode generator 406, a loader 408, and a Java® runtime library 410 according to the present invention operate above the layer of the Java® VM 404. In one embodiment, the PHP Java® bytecode generator 406 is implemented by modifying some functions of an ordinary PHP processing system and generates bytecode that can be executed by the Java® VM 404 by interpreting PHP source code (script). In this case, it should be noted that the loader 408 and the Java® runtime library 410 are also modified so as to implement the functions of the present invention.

PHP source code 412 is stored in the hard disk drive 308 and is a file that includes statements described in <?php~?> and has an extension php, as is known. In response to a request received from a client computer (not shown) via a network, the PHP Java® bytecode generator 406 generates bytecode by interpreting and executing the specified PHP source code 412.

A process in which the PHP Java® bytecode generator 406 and the like register a class by interpreting the content of the PHP source code 412 will next be described with reference to flowcharts in FIGS. 5 to 7.

Figure 5:
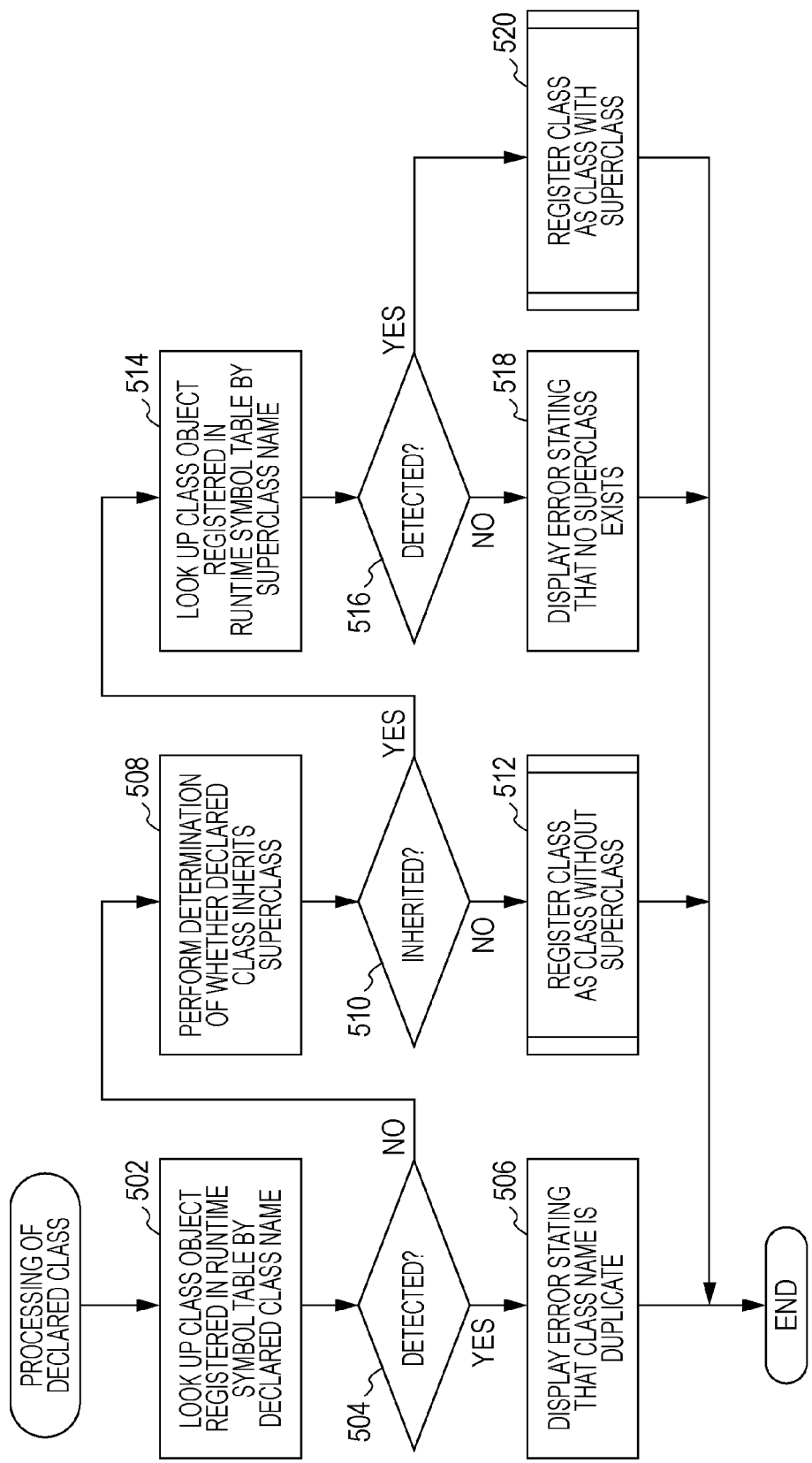
FIG. 5 is a flowchart of a process of registering a Java® class corresponding to a PHP class.

In step 502 in FIG. 5, when a declaration of a class exists in the PHP source code 412, the PHP Java® bytecode generator 406 looks up a class object registered in a runtime symbol table by the declared class name. The runtime symbol table is an area that is reserved in the main memory 306 in advance so as to store, for example, class names.

When a class object registered in the runtime symbol table has been detected, in step 504, the process branches to step 506 where an error stating that the class name is duplicate is displayed and is then terminated.

When no class object registered in the runtime symbol table has been detected, in step 504, the process branches to step 508 where the PHP Java® bytecode generator 406 determines whether the declared class inherits (extends) a superclass.

When the PHP Java® bytecode generator 406 determines that the declared class does not inherit a superclass, the process branches from step 510 to step 512 where the class is registered as a class without a superclass. The process in step 512 will be described below in detail with reference to the flowchart in FIG. 6.

When the PHP Java® bytecode generator 406 determines that the declared class inherits a superclass, the process proceeds to step 514 where the PHP Java® bytecode generator 406 looks up a class object registered in the runtime symbol table by the superclass name.

When no superclass registered in the runtime symbol table has been detected, in step 516, the process branches to step 518 where an error stating that no superclass has been detected is displayed and is then terminated.

When a superclass registered in the runtime symbol table has been detected, in step 516, the process branches to step 520 where the class is registered as a class with a superclass. The process in step 520 will be described below in detail with reference to the flowchart in FIG. 7.

The process of registering a class as a class without a superclass will next be described with reference to the flowchart in FIG. 6. In step 602, the PHP Java® bytecode generator 406 attempts to fetch a class object to a relevant place, i.e., a permanent class cache related to the PHP code that is currently processed.

When a class object has been fetched, in step 604, the process branches to step 606 where the class object is registered in the runtime symbol table by the declared class name and is then terminated.

When no class object has been fetched in step 602, the process branches from step 604 to step 608 where the PHP Java® bytecode generator 406 generates and loads the Java® VM bytecode of a class inheriting a base class of a PHP object.

In step 610, the PHP Java® bytecode generator 406 stores the loaded class object in the relevant place, i.e., the permanent class cache related to the PHP code that is currently processed, and the process proceeds to step 606. In step 606, the class object is registered in the runtime symbol table by the declared class name, and then, the process is terminated.

The process of registering a class as a class with a superclass will next be described with reference to the flowchart in FIG. 7. In step 702, the PHP Java® bytecode generator 406 attempts to fetch a class object from a relevant place, i.e., a permanent class inheritance cache, in a memory, related to the PHP code that is currently processed, with the class object of the superclass being a key.

When a class object has been fetched, in step 704, the process branches to step 706 where the class object is registered in the runtime symbol table by the declared class name and is then terminated.

When no class object has been fetched in step 702, the process branches from step 704 to step 708 where the PHP Java® bytecode generator 406 generates the Java® VM bytecode of a class inheriting the class object of the superclass.

In step 710, the PHP Java® bytecode generator 406 loads the bytecode using a class loader of the superclass or any child class.

In step 712, the PHP Java® bytecode generator 406 stores the loaded class object in the relevant place, i.e., the permanent class inheritance cache, in a memory, related to the PHP code that is currently processed, with the class object of the superclass being a key, and the process proceeds to step 706. In step 706, the class object is registered in the runtime symbol table by the declared class name, and then, the process is terminated.

While the process of loading and registering a Java® class according to a class described in PHP source code has been described, further description will be given using a specific example to deepen understanding of the present invention.

Figure 8:
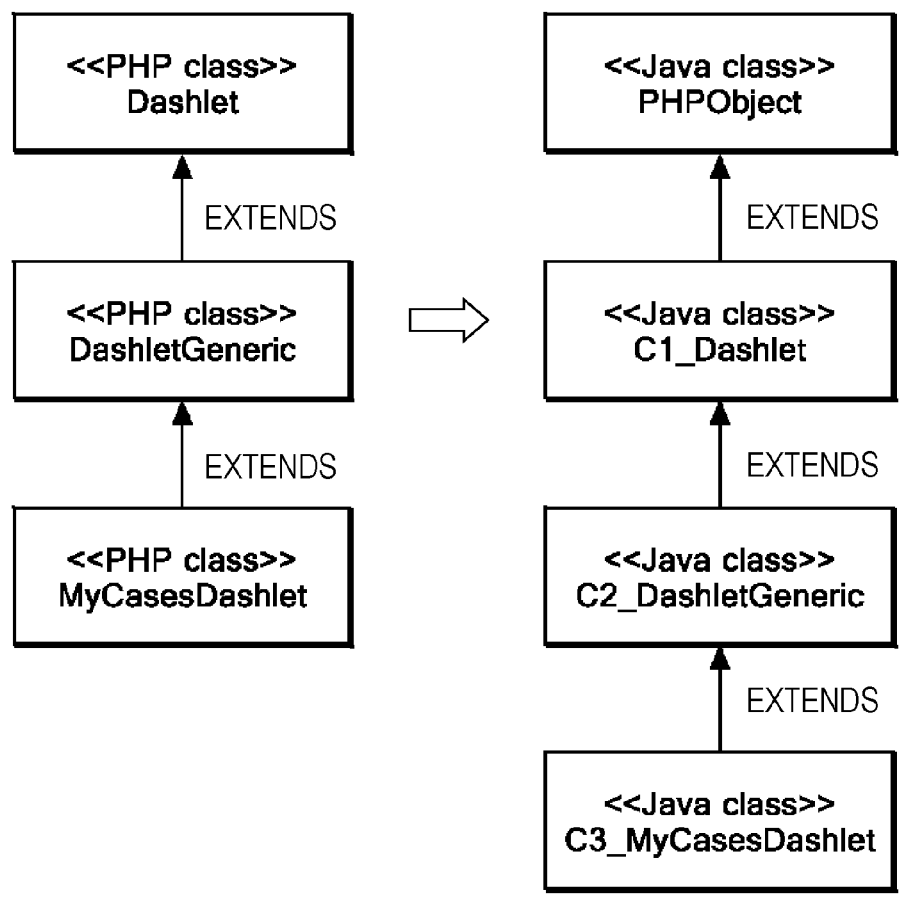
FIG. 8 is a diagram showing exemplary correspondences between PHP classes and Java® classes.

FIG. 8 shows the correspondence between an exemplary PHP class hierarchy and a Java® class hierarchy generated accordingly by the PHP Java® bytecode generator 406.

The PHP class hierarchy is composed of Dashlet serving as a superclass, DashletGeneric inheriting Dashlet, and MyCasesDashlet inheriting DashletGeneric, as shown in the drawing.

The Java® class hierarchy generated corresponding to the PHP class hierarchy is composed of PHPObject serving as a superclass, C1_Dashlet inheriting PHPObject, C2_DashletGeneric inheriting C1_Dashlet, and C3_MyCasesDashlet inheriting C2_DashletGeneric.

In the Java® classes generated corresponding to the PHP classes, PHPObject is set as a base superclass, as can be seen from the drawing. In the Java® classes, the hierarchical structure under PHPObject corresponds to the PHP class hierarchy. Preferably, an appropriate prefix is automatically attached to each corresponding class name by the PHP Java® bytecode generator 406 so as to avoid class name conflicts.

Figure 9:
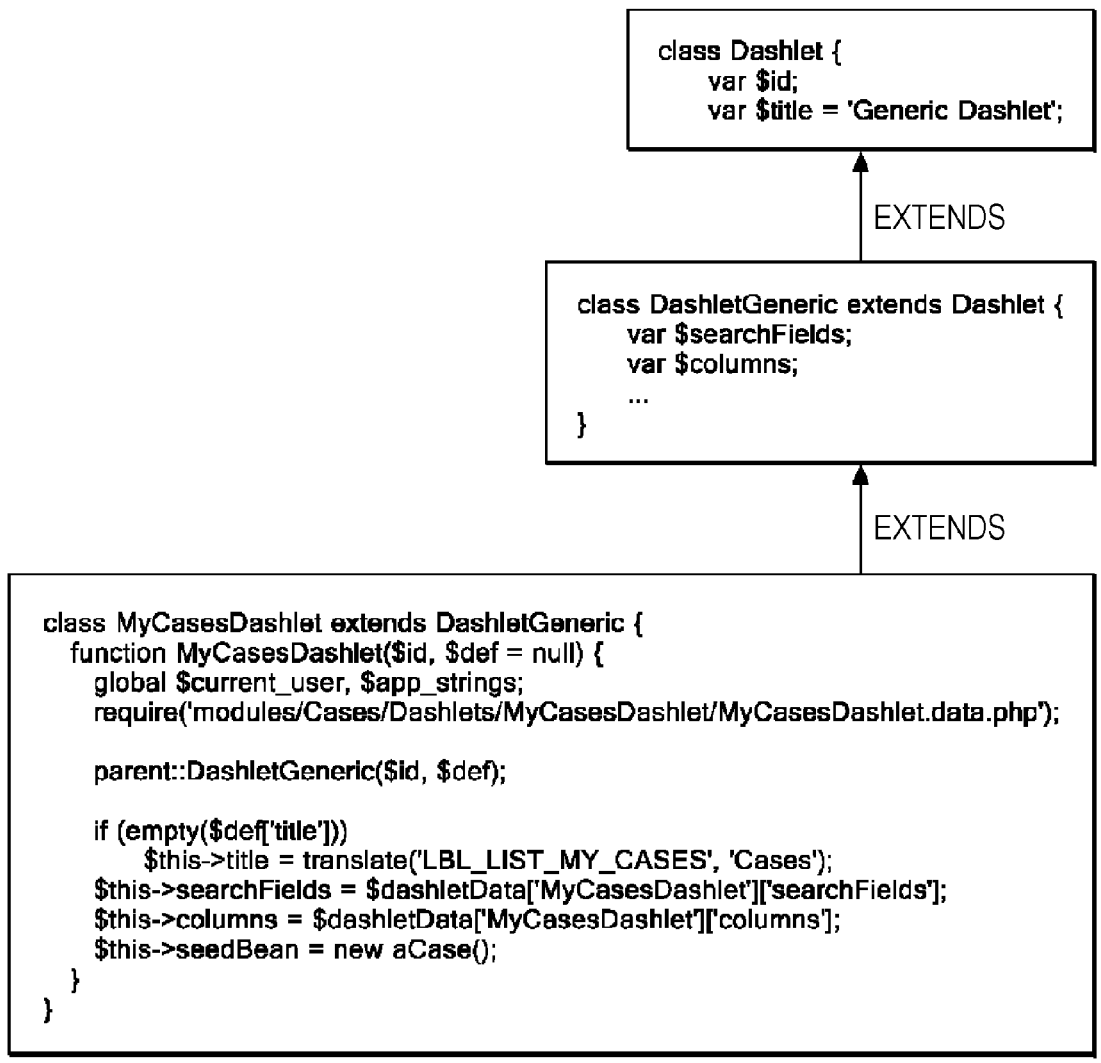
FIG. 9 is a diagram showing exemplary code of inheritance of PHP classes.

FIG. 9 shows a part of the description of source code of the PHP classes in FIG. 8, including inheritance (extends), for reference purposes.

Figure 2:
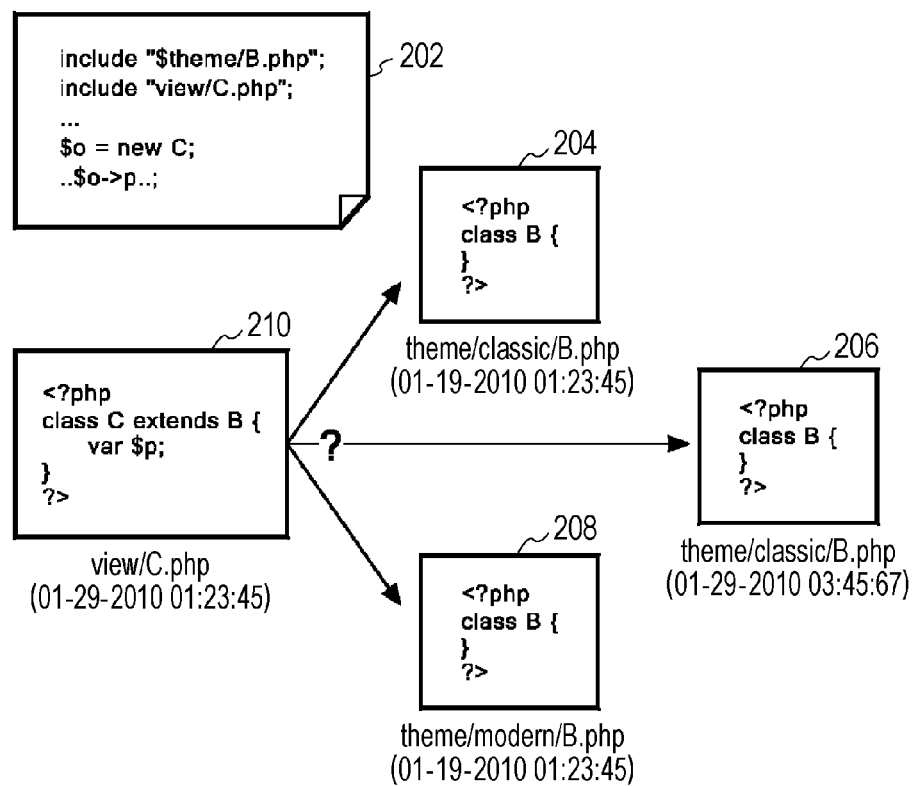
FIG. 2 illustrates how a PHP class inherits different superclasses depending on the case.
Figure 10:
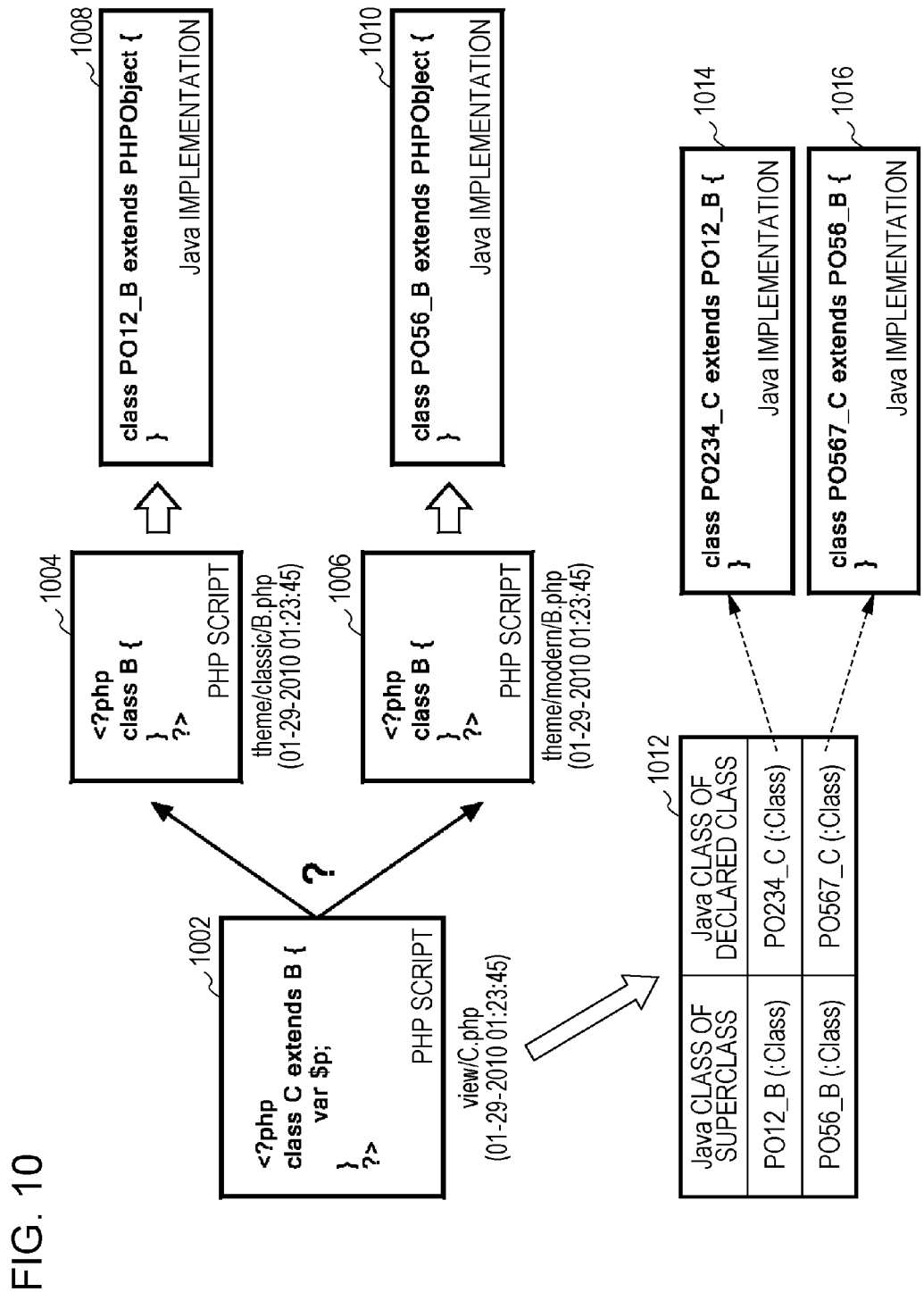
FIG. 10 is a diagram showing how hierarchical relationships are recorded by generating Java® classes corresponding to PHP classes.

FIG. 10 shows an example showing correspondences between PHP classes and Java® classes. Class C described in PHP source code 1002 inherits class B described in PHP source code 1004 or class B described in PHP source code 1006, depending on the case, as described in relation to FIG. 2.

According to the present invention, for a PHP class, a Java® class with a unique name is generated. That is, for class B described in the PHP source code 1004, a Java® class 1008 named PO12_B is generated using a prefix PO12_. For class B described in the PHP source code 1006, a Java® class 1010 named PO56_B is generated using a prefix PO56_. Such prefixes are automatically generated by the PHP Java® bytecode generator 406 so as to avoid class name conflicts.

The reason why a single Java® class is uniquely generated for each of class B described in the PHP source code 1004 and class B described in the PHP source code 1006 in this manner is that each class B has no superclass in a PHP script.

Figure 6:
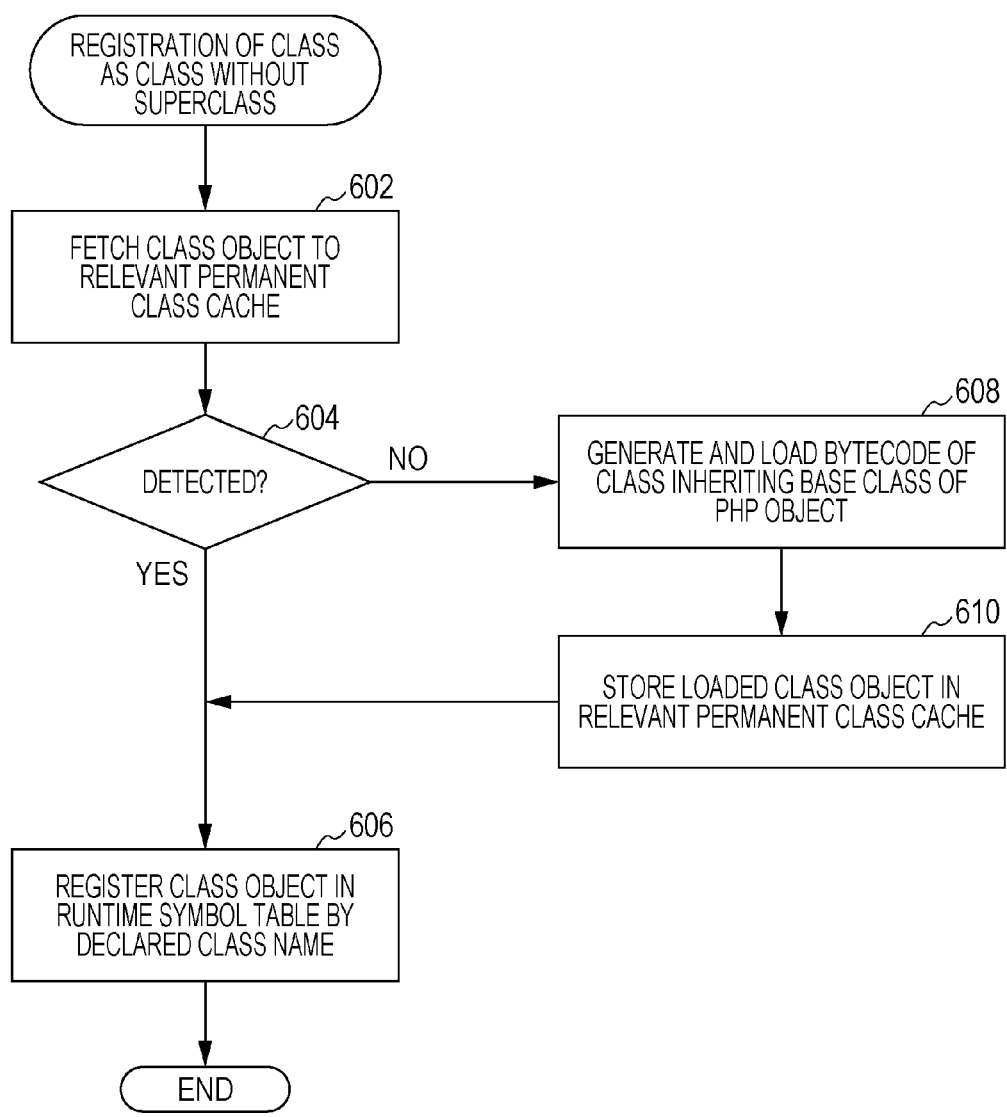
FIG. 6 is a flowchart of a process of registering a class as a class without a superclass.

According to the present invention, for a class having no superclass, a class object is stored in a permanent class cache reserved in a predetermined area in the main memory 306, as shown in step 610 in FIG. 6.

On the other hand, for class C described in the PHP source code 1002, different Java® classes 1014 and 1016 respectively having prefixes PO234_ and PO567_ are generated, depending on which of class B described in the PHP source code 1004 and class B described in the PHP source code 1006 is inherited.

Figure 7:
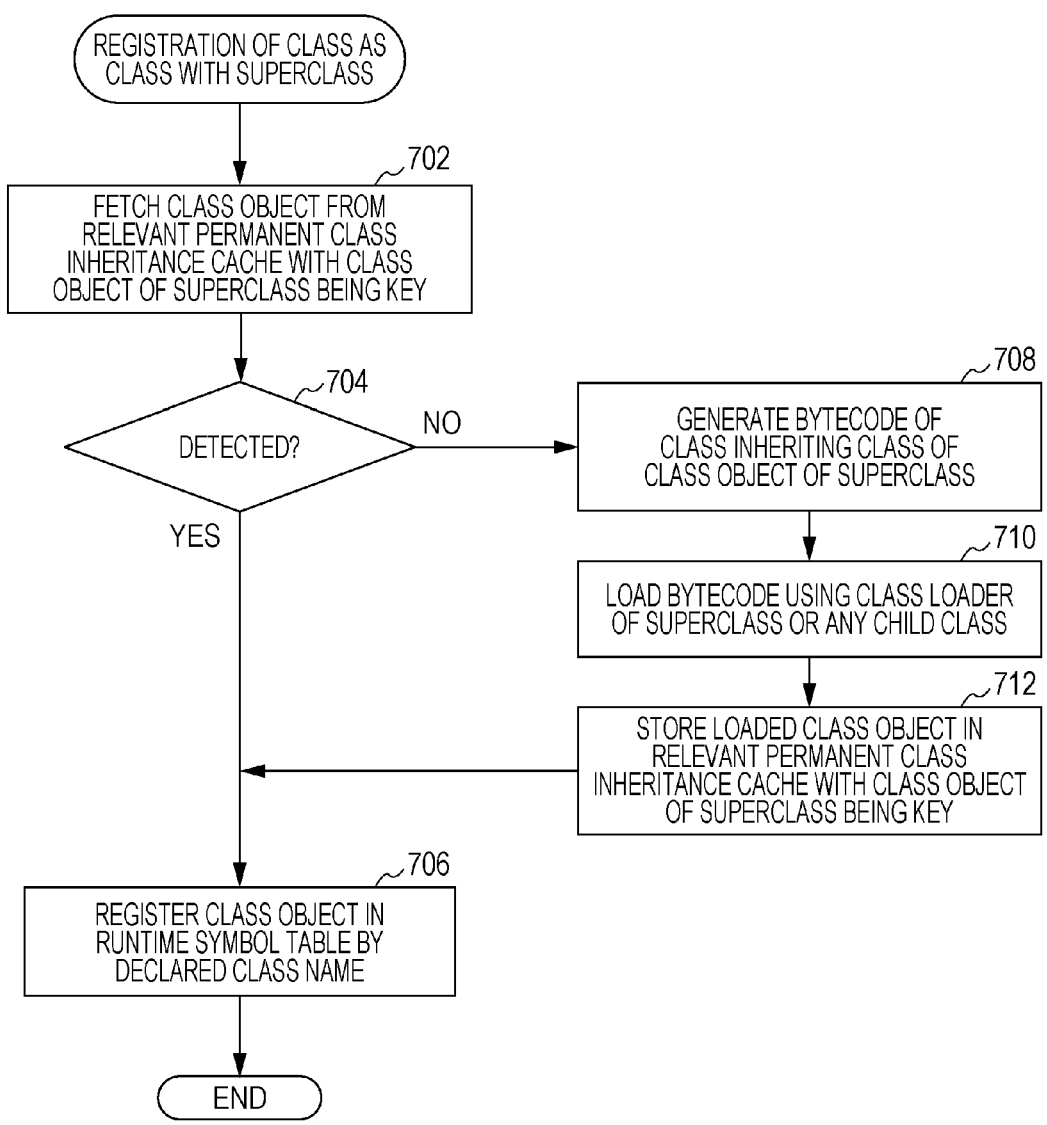
FIG. 7 is a flowchart of a process of registering a class as a class with a superclass.

Moreover, according to the present invention, for a class having a superclass, a class object is stored in a permanent class inheritance cache, as shown in step 712 in FIG. 7. A class inheritance relationship cache table 1012 shown in FIG. 10 holds inheritance relationships between class objects stored in a permanent class cache and class objects stored in a permanent class inheritance cache. Information in the class inheritance relationship cache table 1012 is located at a predetermined location in the main memory 306.

FIG. 11 shows more detailed information in the class inheritance relationship cache table 1012. The class inheritance relationship cache table 1012 includes information on a place for declaration and an implementation of an inherited superclass as keys and an implementation of a declared class as a value, as shown in the drawing.

FIG. 12 shows an example in which reflective access (specifying a property by a dynamic value) to a property of a PHP class is handled. It can be seen from Java code 1202 that class PHPObject inherits class PHPValue.

Moreover, it should be noted that a Java class 1206 corresponding to PHP source code 1204 implements interface class PropertyHolder_q corresponding to property name $q in the PHP source code 1204 and overrides protected PHPValue getReflectivelyNoWarning(NameString propName){ } in the Java code 1202. Interface class PropertyHolder_q, together with a class implementing it, is generated by the PHP Java® bytecode generator 406. The details of PropertyHolder_q will be described below.

Figure 13:
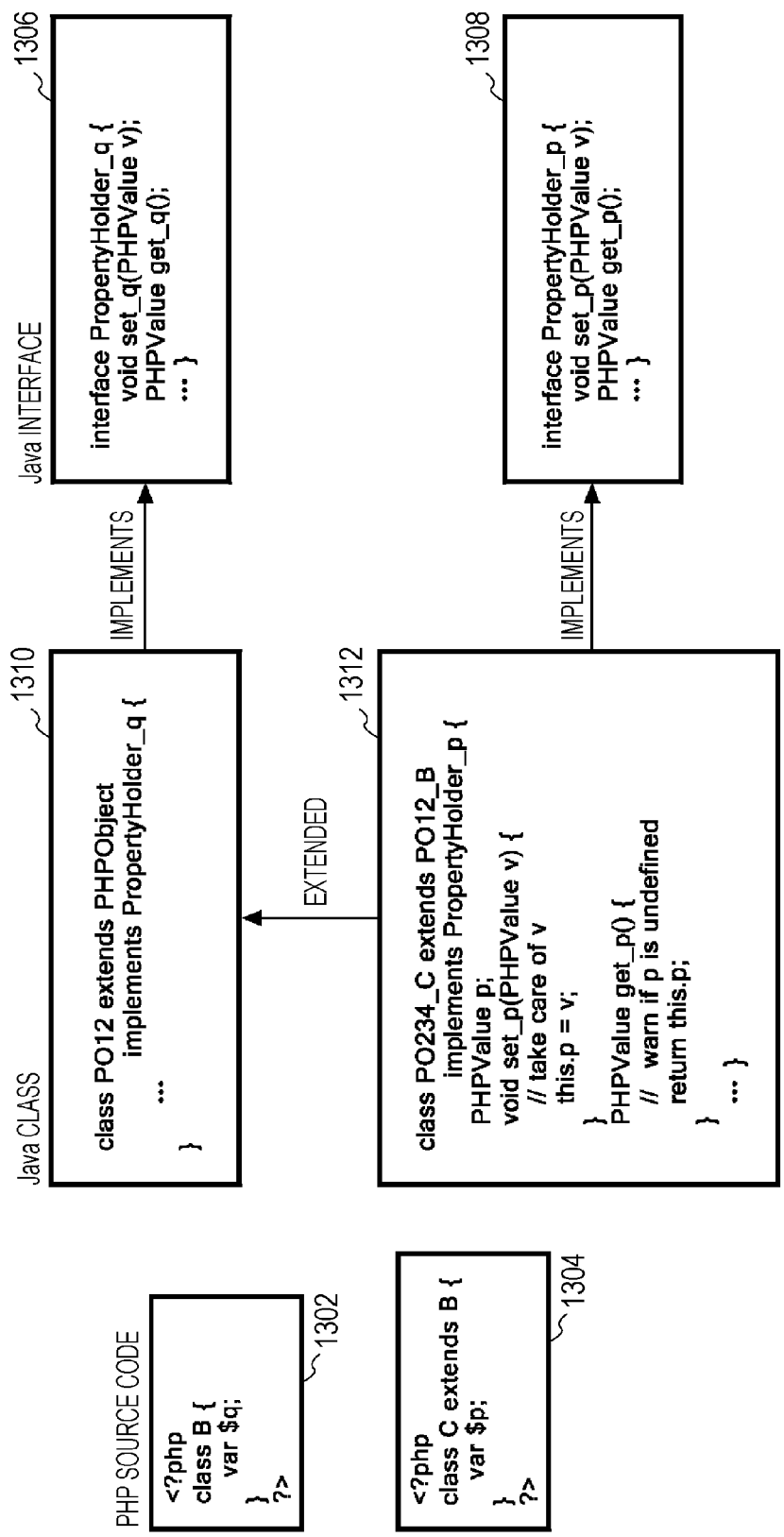
FIG. 13 is a diagram showing exemplary Java® interface classes corresponding to PHP classes.

FIG. 13 shows Java® interface classes PropertyHolder_q 1306 and PropertyHolder_p 1308 respectively corresponding to a class 1302 declared in PHP source code and a class 1304 inheriting the class 1302, class PO12_B 1310 implementing interface class PropertyHolder_q, and class PO234_C 1312 implementing interface class PropertyHolder_p and inheriting class PO12_B. In this arrangement, what is called setter/getter access to a class can be implemented.

Figure 14:
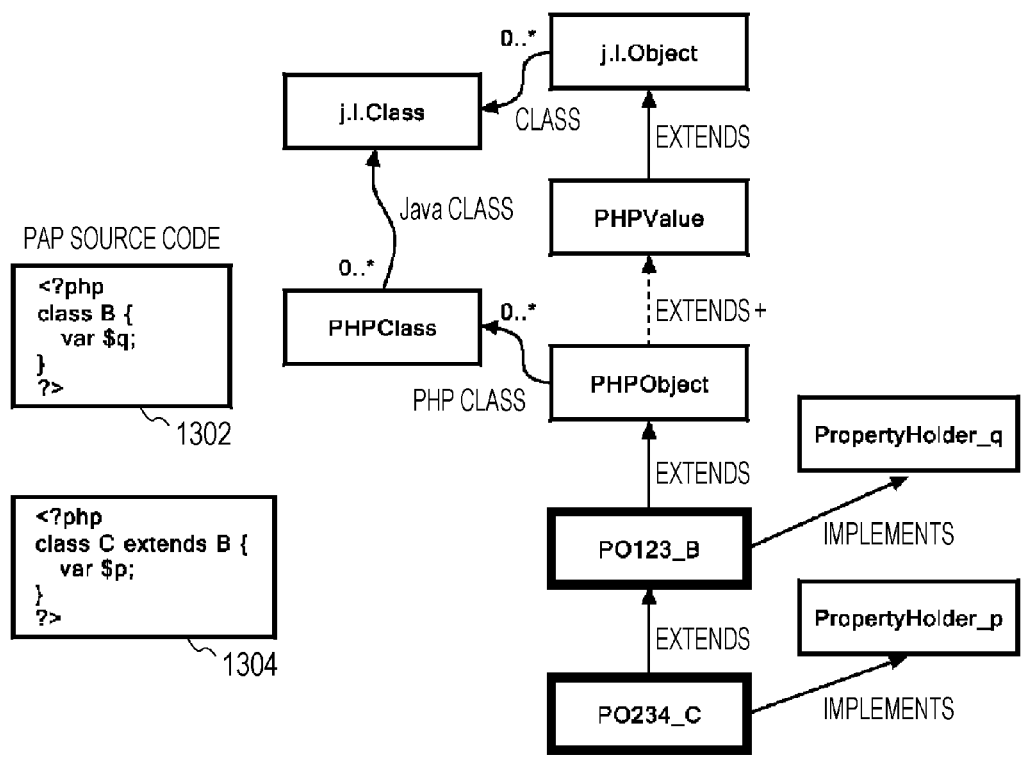
FIG. 14 is a diagram showing an exemplary class hierarchy diagram.

FIG. 14 shows a class diagram of classes generated or inherited corresponding to the class 1302 declared in the PHP source code and the class 1304 inheriting the class 1302 for reference purposes.

Figure 15:
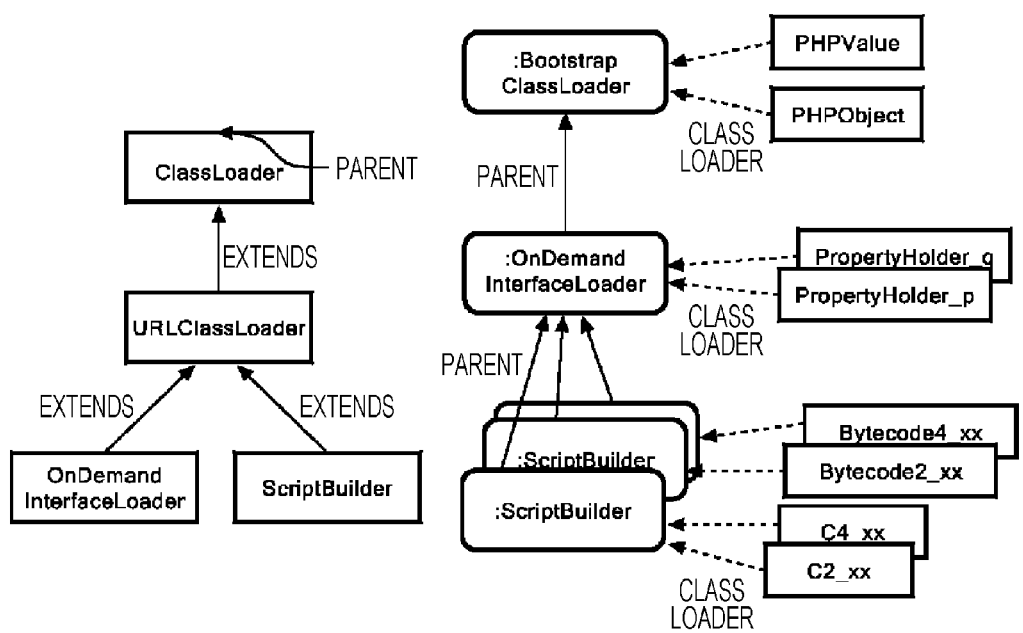
FIG. 15 is a diagram showing hierarchical relationships between class loaders.

Moreover, FIG. 15 shows a hierarchy of class loaders including an on-demand interface loader. The class loaders are shown as the loader 408 in FIG. 4.

In FIG. 15, ScriptBuilder is a class loader loading a group of pieces of Java bytecode generated corresponding to PHP scripts (source code) (each class loader can be discarded at a time).

In this case, OnDemandInterfaceLoader is a class loader loading a group of pieces of Java bytecode of interfaces created for individual property names. For the security of Java class loaders, a class using an interface for each property needs to be loaded by a class loader having loaded the interface or a child class loader (independent of the inheritance relationship between classes) of the class loader. Thus, the hierarchy as shown in FIG. 15 is adopted.

It is assumed that, when such Java classes are generated corresponding to PHP classes, the following PHP code exists:

```
<?php
include "view/C.php"
$o = new C;
$v = $o->p;
?>
``` where it is assumed that view/C.php is the following code:

```
<?php
class C extends B {
var $p;
}
```

Then, bytecode is generated by the PHP bytecode generator 406 so that a part $v=$o→p; is converted to the following Java code:

```
PHPValue v = (o instanceof PropertyHolder_p) ?
    ((PropertyHolder_p) o).get_p( ):
    Op.shPROPERTY_R(o,runtime,"p");
```

That is, when o is the instance of PropertyHolder_p, ((PropertyHolder_p) o).get_p( ) is executed. This is getter access and thus relatively fast.

On the other hand, when o is not the instance of PropertyHolder_p, Op.shPROPERTY_R(o,runtime,"p") is executed and takes a relatively long time.

Specifically,

```
PHPValue shPROPERTY_R(PHPValue o, Runtime r,
String propertyName)
{
    if (o instanceof PHPObject) {
    return ((PHPObject) o).getNotDeclared(propertyName);
    } else {
    ....
    }
}
``` is obtained by writing down shPROPERTY_R( ) in detail, and a declaration of PHPObject is as shown in 1202 in FIG. 12. Thus, a hash search by propertyName such as:

```
properties.get(propertyName);
takes a long time.
```

However, an arrangement provided by the present invention enables avoidance of execution of heavy processing such as PHPValue v=Op.shPROPERTY_R(o,runtime,"p"); when o is the instance of PropertyHolder_p at $v=$o→p;.

For reference purposes, bytecode corresponding to

```
PHPValue v = (o instanceof PropertyHolder_p) ?
    ((PropertyHolder_p) o).get_p( ):
    Op.shPROPERTY_R(o,runtime,"p");
``` is as follows:

```
aload <o>
dup
instanceof PropertyHolder_p
ifeq general
checkcast PropertyHolder_p
invokeinstance PropertyHolder_p.get_p( )LPHPValue
goto done
general:
.. Op.shPROPERTY_R(o,runtime,<propertyref p>);
done
astore <v>
```

While the embodiment of the present invention has been described taking the example in which PHP is used as a dynamic scripting language, and Java® is used as a static language, those skilled in the art will appreciate that the present invention is not limited to such a specific programming language processing system or execution system but can be applied to any processing system such as Perl, Ruby, or Python that supports object-oriented concepts as a dynamic scripting language. Moreover, not limited to Java®, any execution system that supports object-oriented concepts can be used as the static language execution system.

Moreover, those skilled in the art will appreciate that the present invention can be used in not only a server environment but also any environment such as a stand-alone environment or a cloud computing environment and is not limited to a specific operating system or hardware.

REFERENCE SIGNS LIST

302: system bus
304: CPU
306: main memory
308: hard disk drive
310: keyboard
312: mouse
314: display
316: communication interface
402: operating system
404: Java VM
406: PHP bytecode generator
408: loader
410: runtime library
412: source code

The invention claimed is:

1. A computer implemented method for virtually executing a program having property declarations of classes in a first programming language that is a dynamic scripting language on an execution system of a second programming language, the method comprising the steps of:

generating an interface class that is uniquely determined from a property name in the program in the first programming language;
loading the interface class; and
preparing, for a first class of the first programming language occurring during execution of the program in the first programming language, when the first class of the first programming language directly inherits a second class of the first programming language, a class hierarchy on the execution system of the second programming language so that the class hierarchy corresponds to a dynamically created class hierarchy on the program in the first programming language by caching a second class of the second programming language inheriting a first class of the second programming language, with the first class of the second programming language corresponding to the first class of the first programming language being a key;
determining whether a second object of the second programming language, corresponding to a first object of the first programming language, is an instance of an interface class of the second programming language; and
converting an operator of the first programming language for obtaining a property of the first object of the first programming language to a conditional operator of the second programming language and a function that returns a corresponding property of the second object of the second programming language in response to determining that the second object of the second programming language, corresponding to the first object, is the instance of the interface class of the second programming language, wherein the converting obviates a use of a hash table;
wherein fields are prepared in the first and second classes of the second programming language corresponding to the respective property declarations of the first and second classes of the program in the first programming language,
wherein a processor connected to a memory device is configured to perform: the generating, the loading, the preparing, the determining and the converting.

2. The method according to claim 1, wherein the converting includes:
determining whether the interface class corresponding to the property of the first object is implemented; and
implementing access to a field via the interface class when the interface class is implemented.

3. The method according to claim 1, wherein the first programming language is PHP, and the second programming language is Java®.

4. The computer implemented method according to claim 1, wherein the function that returns the corresponding property of the second object is a get( ) function of the second programming language.

5. A computer readable article of manufacture tangibly embodying non-transitory computer readable instructions which, when executed, cause a computer to carry out the steps of a method for virtually executing a program in a first programming language that is a dynamic scripting language, the program having property declarations of classes, on an execution system of a second programming language, the steps of:
generating an interface class that is uniquely determined from a property name in the program in the first programming language;
loading the interface class;
preparing, for a first class of the first programming language occurring during execution of the program in the first programming language, when the first class of the first programming language directly inherits a second class of the first programming language, a class hierarchy on the execution system of the second programming language so that the class hierarchy corresponds to a dynamically created class hierarchy on the program in the first programming language by caching a second class of the second programming language inheriting a first class of the second programming language, with the first class of the second programming language corresponding to the first class of the first programming language being a key;
determining whether a second object of the second programming language, corresponding to a first object of the first programming language, is an instance of an interface class of the second programming language; and
converting an operator of the first programming language for obtaining a property of the first object of the first programming language to a conditional operator of the second programming language and a function that returns a corresponding property of the second object of the second programming language in response to determining that the second object of the second programming language, corresponding to the first object, is the instance of the interface class of the second programming language, wherein the converting obviates a use of a hash table;
wherein fields are prepared in the first and second classes of the second programming language corresponding to the respective property declarations of the first and second classes of the program in the first programming language.

6. The manufacture according to claim 5, wherein the converting includes:
determining whether the interface class corresponding to the property of the first object is implemented; and
implementing access to a field via the interface class when the interface class is implemented.

7. The manufacture according to claim 5, wherein the first programming language is PHP, and the second programming language is Java®.

8. A computer implemented system for virtually executing a program in a first programming language that is a dynamic scripting language, the program having property declarations of classes, on an execution system of a second programming language, the system comprising:
a memory device;
a processor connected to the memory device,
wherein the processor is configured to perform:
generating an interface class that is uniquely determined from a property name in the program in the first programming language;
loading the interface class; and
preparing, for a first class of the first programming language occurring during execution of the program in the first programming language, when the first class of the first programming language directly inherits a second class of the first programming language, a class hierarchy on the execution system of the second programming language so that the class hierarchy corresponds to a dynamically created class hierarchy on the program in the first programming language by caching a second class of the second programming language inheriting a first class of the second programming language, with the first class of the second programming language corresponding to the first class of the first programming language being a key;

determining whether a second object of the second programming language, corresponding to a first object of the first programming language, is an instance of an interface class of the second programming language; and converting an operator of the first programming language for obtaining a property of the first object of the first programming language to a conditional operator of the second programming language and a function that returns a corresponding property of the second object of the second programming language in response to determining that the second object of the second programming language, corresponding to the first object, is the instance of the interface class of the second programming language, wherein the converting obviates a use of a hash table;

wherein fields are prepared in the first and second classes of the second programming language corresponding to the respective property declarations of the first and second classes of the program in the first programming language.

9. The system according to claim 8, wherein the converting includes:

determining whether the interface class corresponding to the property of the first object is implemented; and implementing access to a field via the interface class when the interface class is implemented.

10. The system according to claim 8, wherein the first programming language is PHP, and the second programming language is Java®.

* * * * *